United States Patent [19]
Pagan et al.

[11] 3,726,531
[45] Apr. 10, 1973

[54] STERN TUBE SEAL
[75] Inventors: Peter A. Pagan, La Palma; Paul T. Mitchell, Huntington Beach, both of Calif.
[73] Assignee: American Metal Bearing Company, Los Angeles, Calif.
[22] Filed: Dec. 7, 1970
[21] Appl. No.: 95,482

[52] U.S. Cl. ................................. 277/59, 115/.5 R
[51] Int. Cl. .............................................. F16j 15/32
[58] Field of Search ............... 114/.5 R; 115/.5 R, 115/34; 277/58–63

[56] References Cited
UNITED STATES PATENTS
3,413,008   11/1968   Greiner ........................... 277/58

*Primary Examiner*—Joseph R. Leclair
*Assistant Examiner*—Robert I. Smith
*Attorney*—Lyon & Lyon

[57] ABSTRACT

A stern tube seal installation comprising an aft seal unit and a forward seal unit, each unit including a lubricant filled seal chamber confronting a propeller shaft or liner thereon, the seal chamber containing a rotation restrained floating ring sealed at its ends with respect to the chamber and spaced from the shaft by a centering ring flanked by at least a pair of seal rings engaging the shaft. Lubricant passages extend through the floating ring and centering ring to the shaft liner between the seal rings.

7 Claims, 2 Drawing Figures

3,726,531

STERN TUBE SEAL

BACKGROUND OF THE INVENTION

The problem of providing an adequate seal for the propeller shaft is a severe one, for failure of the seal results in costly repairs. Until recent years, water lubrication was standard practice. Only recently have attempts been made to provide an oil seal. This has required special provision for the exclusion of water for an oil-water emulsion is highly objectionable. Also, the escape of oil should be minimized. Typical of prior attempts to solve the problem are disclosed in U.S. Pat. Nos. 3,169,504; 3,413,008 and West German Pat. No. 858,371.

Because of the high cost of repair, it is essential that stern tube seals have an extremely long life; exceeding, if possible, that of the bearing itself. As the bearing wears, the resulting flexing of the propeller causes excess wear of the shaft engaging seals which protect the bearing, or induces rapid flexing of the seal which interferes with their sealing function with the result that water intrudes and oil leaks out, accelerating bearing and shaft wear.

SUMMARY OF THE INVENTION

The present invention is directed to an improved stern tube seal installation and is summarized in the following objects:

First, to provide a stern tube seal installation which has high compliance to flexing movement of the propeller shaft due to normal wear of the bearing so that the shaft, or shaft liner, engaging the seal rings is maintained in constant sealing contact and is subject to minimal wear.

Second, to provide a stern tube seal installation having an aft seal unit and a forward seal unit, each including an annular lubricant receiving chamber confronting the shaft or a liner thereon, which receives a non-rotating floating ring spaced from the shaft by a low friction centering ring flanked by seal rings which engage the shaft or its liners.

Third, to provide a stern tube seal installation having an aft seal unit and a forward seal unit, each housing an easily replaceable cartridge seal assembly, and each cartridge seal assembly consisting of a non-rotating ring, a low friction centering ring, and seal rings which engage the shaft or its liner.

Figure 1:
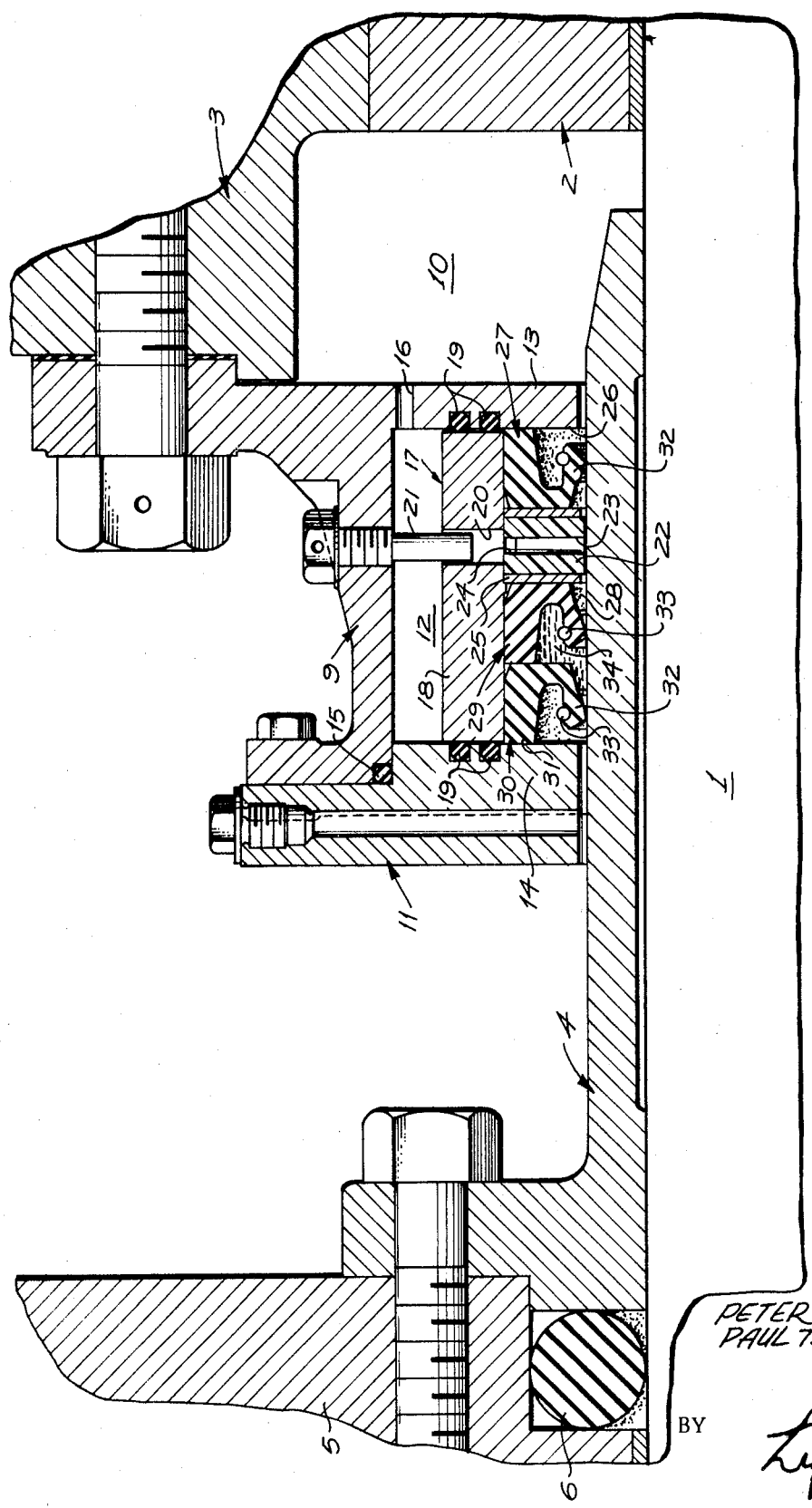
FIG. 1 is a fragmentary sectional view, showing the aft seal unit of the stern tube seal.

A stern tube seal installation is intended to seal a propeller shaft 1. The propeller shaft extends through a bearing 2 mounted within a stern tube 3. Suitably secured to the propeller shaft is an aft liner 4, bolted or otherwise secured to a propeller hub 5 which is provided with a seal ring 6 bearing directly against the propeller shaft 1. At the forward end of the stern tube, the propeller shaft is provided with a forward shaft liner 7, and is provided with a seal 8 to prevent flow of lubricant between the shaft liner 7 and the propeller shaft. The structure so far described is conventional.

Reference is directed to FIG. 1. Secured and sealed to the aft end of the stern tube 3 is an annular aft housing 9, which forms with the stern tube an aft bearing lubricant chamber 10. A cover plate 11 is bolted or otherwise secured to the aft end of the housing 9 and forms therewith an aft seal lubricant chamber 12 confronting the aft shaft liner 4. The chamber 12 is separated from the chamber 10 by a forward end wall 13 which extends into proximity with the aft liner 4. The cover plate 11 forms an aft end wall 14 of the chamber 12, which also extends into proximity with the aft liner 4. The spacing between the walls 13 and 14 and the liner is such as to permit a predetermined radial displacement of the propeller shaft without engaging the aft liner. A seal 15 between the cover plate and housing excludes water from entering the chamber 12. One or more passages 16 through the forward end wall 13 connect the chambers 10 and 12.

The chamber 12 receives an aft shaft cartridge seal assembly 17, which includes a floating ring 18, capable of radial movement within the chamber 12. The end walls 13 and 14 are provided with one or more seal rings 19 which engage the axial ends of the ring 18, or conversely, the seal rings may be fitted in the ends of the floating ring 18. The floating ring is provided with one or more radial openings 20, which loosely receive radially extending anti-rotation pins 21 secured in the housing 9. Positioned between the floating ring 18 and the liner 4 is a centering ring 22. The centering ring is preferably formed of molybdenum filled Teflon, the purpose being to provide a ring having minimal friction. In this regard, the seal rings 19 are also preferably formed of molybdenum filled Teflon to provide minimal friction between the floating ring 18 and the end walls 13 and 14. The seal rings 22 and 19 may also be formed of nylon or other minimal friction material.

The centering ring is provided with one or more radial openings 23 which align radially with the openings 20 in the floating ring 18, and are in communication therewith through an annular connecting channel 24 which may be formed in the centering ring or in the floating ring. A backing ring 25, preferably formed of stainless steel, is provided at each axial side of the centering ring 22 as required to minimize cold-flow of the material from which the centering ring is formed. It is to be understood, however, that reference herein to a centering ring refers to a structure that may include either or both of the backing rings 25.

The centering ring forms with the floating ring 18, the forward end wall 13 and the liner 4, a seal ring chamber 26, which receives a lubricant retention seal ring 27. At the aft side of the centering ring there is formed a second seal ring chamber 28, dimensioned to receive a backing seal ring 29 and a water excluding seal ring 30. The seal rings 27, 29 and 30 may be identical, and each includes an outer body portion 31, having a radially inward and axially extending sealing lip 32, which overlies the aft liner 4. A coil spring constrictor ring 33 surrounds the lip 32 to press the lip against the aft liner 4. The sealing lip 32 of the lubricant retention seal ring 27 extends forward, whereas, the sealing lips of the backing seal ring 29 and water excluding seal ring 30 are directed aft.

The seal ring 30 is exposed to water entering between the cover plate 11 and the liner 4, and the backing seal ring 29 is exposed to any water which may pass the seal ring 30. However, on installation, the space between the seal rings 29 and 30 is filled with grease 34.

Figure 2:
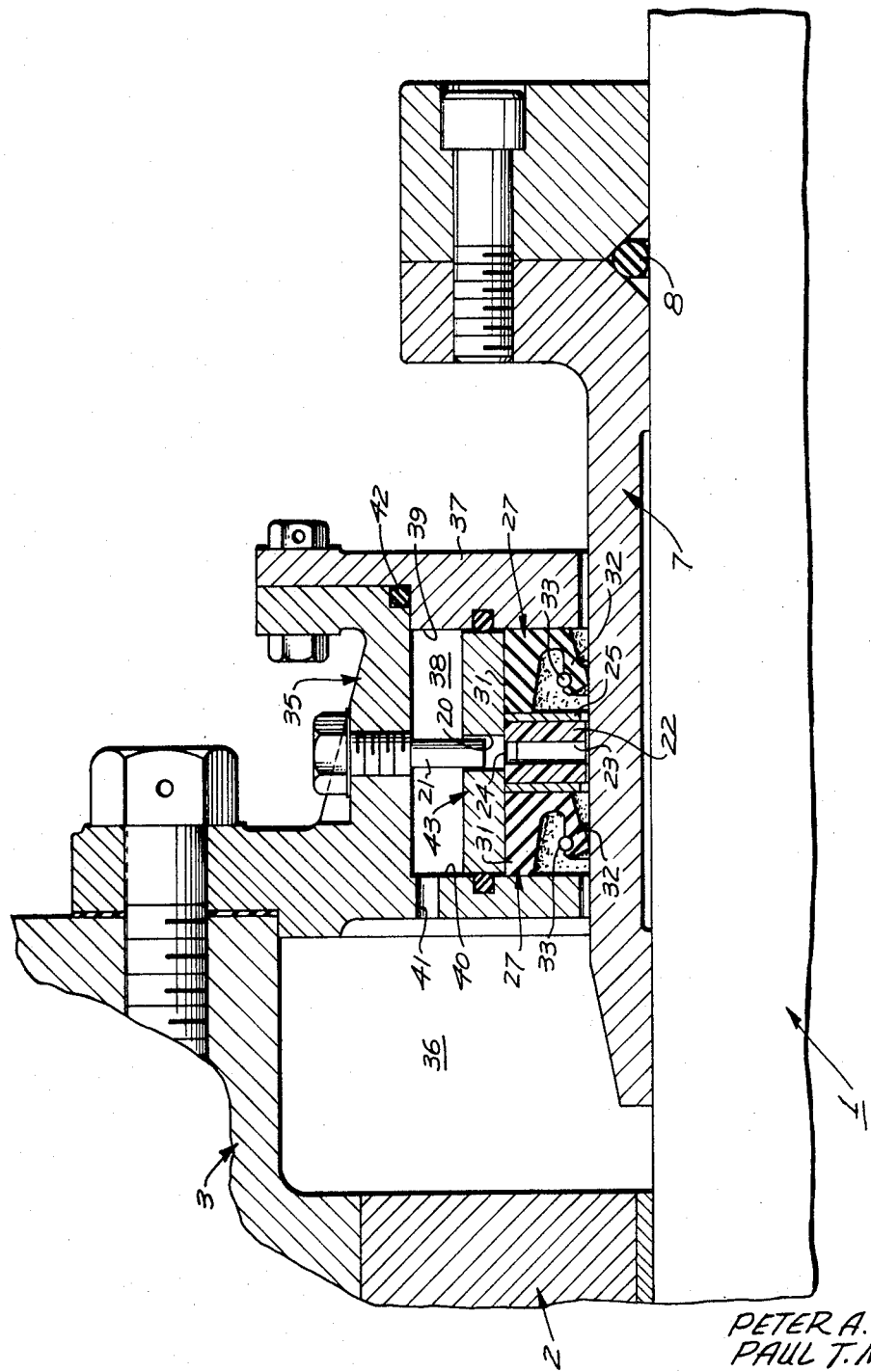
FIG. 2 is a fragmentary sectional view, showing the forward unit of the stern tube seal.

Reference is now directed to FIG. 2, which illustrates a forward seal assembly that is, in most respects, similar to the construction shown in FIG. 1. More particularly, a forward housing 35 is bolted or otherwise secured and sealed to the forward end of the stern tube 3, and forms therewith, a forward bearing lubricant chamber 36. The forward housing is provided with a cover plate 37, corresponding to the cover plate 11, and forms therewith a forward seal lubricant chamber 38. The cover plate 37 forms a forward end wall 39 for the chamber 38, and the housing 35 forms an aft end wall 40 which separates the chamber 38 from the chamber 36.

Similar to the construction shown in FIG. 1, the chambers 36 and 38 are connected by one or more passages 41. A seal 42 is provided between the cover plate 37 and the forward housing 35.

The forward seal lubricant chamber 38 receives a forward shaft cartridge seal assembly 43. The forward seal unit is essentially a duplicate of the aft seal unit; however, it is of extent axial extend than the aft seal unit to accommodate only a pair of lubricant retention rings 27 flanking the centering ring 22, and the same reference characters apply. The function of the forward shaft seal unit is to prevent the escape of lubricant from the chambers 36 and 38 into the hold of the ship.

Operation of the aft and forward shaft seal assemblies forming the stern tube seal installation is as follows:

Because of the fact that repair is extremely costly, it is essential that the stern tube seal installation remain effective for long periods of time, and allow for substantial bearing wear before repair is needed. Thus, even though the bearing may wear to the point that the propeller shaft may vibrate or at least flex to the extent that the cartridge seal assemblies are displaced radially or eccentrically with respect to their chambers 12 and 38, the seals remain concentric with respect to the shaft. The force required to effect such displacement of the cartridge seal assemblies is minimal, as the cartridge seal assembly 17 is readily displaced by radial pressure transmitted through the centering ring. In this regard, it will be noted that there is minimal clearance between the centering ring and the underlying shaft liner so that displacement forces are transmitted to the cartridge seal assembly with minimal radial compression of the sealing lips 32 of the rings 27, 29 and 30. This advantage is gained in part by the use of molybdenum filled Teflon for the centering ring 22 and the sealing rings 19. However, the rings 19 and 22 are exposed to lubricant regardless of the material used, and in particular, a lubricant film is readily maintained between the centering ring 22 and the liner. The important resulting effect is that the compliance of the seal units to lateral displacement of the propeller shaft and its liners is such as to cause minimal wear of the sealing lips 32, and therefore, prolong the life of the seal.

It should be noted that while it is preferred to provide shaft liners 4 and 7, these liners may be omitted and contact made directly with the shaft. Or stated otherwise, the liners being fixed to the shaft become an integral part of the shaft and thus the sealing units may be considered as engaging the shaft, whether the liners are present or not.

It is to be noted that in each form shown, at least a portion of a seal ring engages an end wall and thus functions as an additional seal, inwardly of the seals 19 of FIG. 1, and the corresponding seal of FIG. 2.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:

1. The combination with a stern tube having a bearing assembly therein journalling a propeller shaft, of a shaft sealing unit at an end of the stern tube, said shaft seal unit, comprising:
   a. means defining an axially extending annular lubricant receiving chamber confronting the shaft and having end walls with planar radial surfaces extending into close proximity to said shaft;
   b. a non-rotating, axially extending freely radially floating and radially perforated cylindrical partition received in the chamber surrounding the shaft and dividing the chamber into radially inner and radially outer lubricant receiving chamber portions, said partition defining the outer wall of said radially inner chamber portion;
   c. seals at the axial ends of the floating partition cooperating between the axial ends of the partition and end walls;
   d. a low friction centering ring supporting the floating partition in essentially concentric relation to the shaft and radially perforated for communication with the perforations in the floating ring to conduct lubricant from the lubricant receiving chamber to the shaft;
   e. and seal rings positioned in said radially inner chamber portion, abutting and flanking the centering ring, sealingly engaging the shaft, and extending between said end walls into sealing engagement with said partition and with portions thereof engaging said planar end walls.

2. A shaft seal unit, as defined in claim 1, wherein:
   a. said seal rings include a sea water excluding ring and a backing seal ring aft of the centering ring, and a lubricant retention ring forward of the centering ring.

3. The combination of claim 1 including: means defining a lubricant supply chamber and means for conducting lubricant from said lubricant supply chamber to said radially outer lubricant receiving chamber.

4. The combination of claim 1 wherein said seal rings engage said partition, centering ring and end wall but are otherwise free of securement thereto.

5. The combination of claim 1 wherein said seal rings are of generally C-shape having spaced legs and an intermediate portion, said legs sealingly engaging said shaft and partition, respectively, with said intermediate portion engaging one of said centering ring and end wall.

6. The combination of claim 5 wherein the seal rings on opposite sides of said centering ring are oriented with their legs pointing in respectively opposite axial directions.

7. The combination of claim 5 wherein the seal rings on opposite sides of said centering ring are oriented with their legs pointing in the same axial direction.

* * * * *